United States Patent
Andrew et al.

(10) Patent No.: US 7,809,599 B2
(45) Date of Patent: Oct. 5, 2010

(54) SELECTION OF ITEMS BASED ON RELATIVE IMPORTANCE

(75) Inventors: Suzan Andrew, Seattle, WA (US); Doreen N. Grieb, Kirkland, WA (US); Todd Haugen, Bellevue, WA (US); John Eugene Knapp, Seattle, WA (US); Melinda Nascimbeni, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 533 days.

(21) Appl. No.: 11/276,190

(22) Filed: Feb. 17, 2006

(65) Prior Publication Data

US 2007/0198314 A1 Aug. 23, 2007

(51) Int. Cl.
*G06F 9/46* (2006.01)

(52) U.S. Cl. ............ 705/9; 713/153; 707/999.204; 715/703; 715/963; 709/217

(58) Field of Classification Search .......... 705/8, 705/9
See application file for complete search history.

(56) References Cited

U.S. PATENT DOCUMENTS

| | | | | |
|---|---|---|---|---|
| 5,664,175 | A * | 9/1997 | Jackson et al. .................... 1/1 |
| 6,101,480 | A * | 8/2000 | Conmy et al. .................. 705/9 |
| 6,269,341 | B1 * | 7/2001 | Redcay, Jr. ..................... 705/8 |
| 6,392,669 | B1 * | 5/2002 | Matoba et al. ............... 715/751 |
| 6,549,939 | B1 * | 4/2003 | Ford et al. ................... 709/217 |
| 6,707,471 | B2 * | 3/2004 | Funaki ....................... 715/751 |
| 6,721,778 | B1 * | 4/2004 | Smith et al. ................. 718/103 |
| 6,834,195 | B2 * | 12/2004 | Brandenberg et al. .... 455/456.3 |
| 7,091,959 | B1 * | 8/2006 | Clary .......................... 345/173 |
| 7,266,761 | B2 * | 9/2007 | Levine et al. ............... 715/201 |
| 7,353,465 | B2 * | 4/2008 | Callaway et al. ............... 705/8 |
| 7,379,888 | B1 * | 5/2008 | Mahapatro ..................... 705/8 |
| 2003/0018651 | A1 * | 1/2003 | Funaki ..................... 707/104.1 |
| 2004/0125142 | A1 * | 7/2004 | Mock et al. ................. 345/765 |
| 2004/0172279 | A1 * | 9/2004 | Carolan et al. ................ 705/1 |
| 2005/0198085 | A1 * | 9/2005 | Blakey et al. ............... 707/204 |
| 2005/0257043 | A1 * | 11/2005 | Adams et al. ............... 713/153 |
| 2006/0085217 | A1 * | 4/2006 | Grace ........................... 705/1 |

(Continued)

OTHER PUBLICATIONS

Work & Family Life, Mar. 2001, New York, vol. 15, Iss. 3, p. 6; ProQuest document ID: 69264131, URL: http://proquest.umi.com/pqdlink?did=69264131&Fmt=7&clientId=19649&RQT=309 &VName=PQD.*

*Primary Examiner*—Beth V. Boswell
*Assistant Examiner*—Alan Miller
(74) *Attorney, Agent, or Firm*—Senniger Powers LLP

(57) ABSTRACT

Methods and systems for prioritizing items and displaying those items in a single view of a personal information management (PIM) application are disclosed. PIM software can prioritize items for display in the single view based on a comparison of the date of creation of the item versus the amount of time remaining to complete the item. PIM software may also take into account a priority level of the item. As an item has less time remaining as compared to the date of creation, the likelihood the item will be included in the single display increases. Any item whose due date is 'today' may be included in the single view. Items without due dates might not ever appear in the single view. Users can thus get a quick overview of items that need to be taken care of that day, without being inundated with items that can wait until another day.

15 Claims, 10 Drawing Sheets

U.S. PATENT DOCUMENTS

2006/0095857 A1* 5/2006 Torvinen .................... 715/764
2007/0061487 A1* 3/2007 Moore et al. ................ 709/246
2007/0198314 A1* 8/2007 Andrew et al. ................. 705/8
2008/0141247 A1* 6/2008 Saravanan ................... 718/100

* cited by examiner

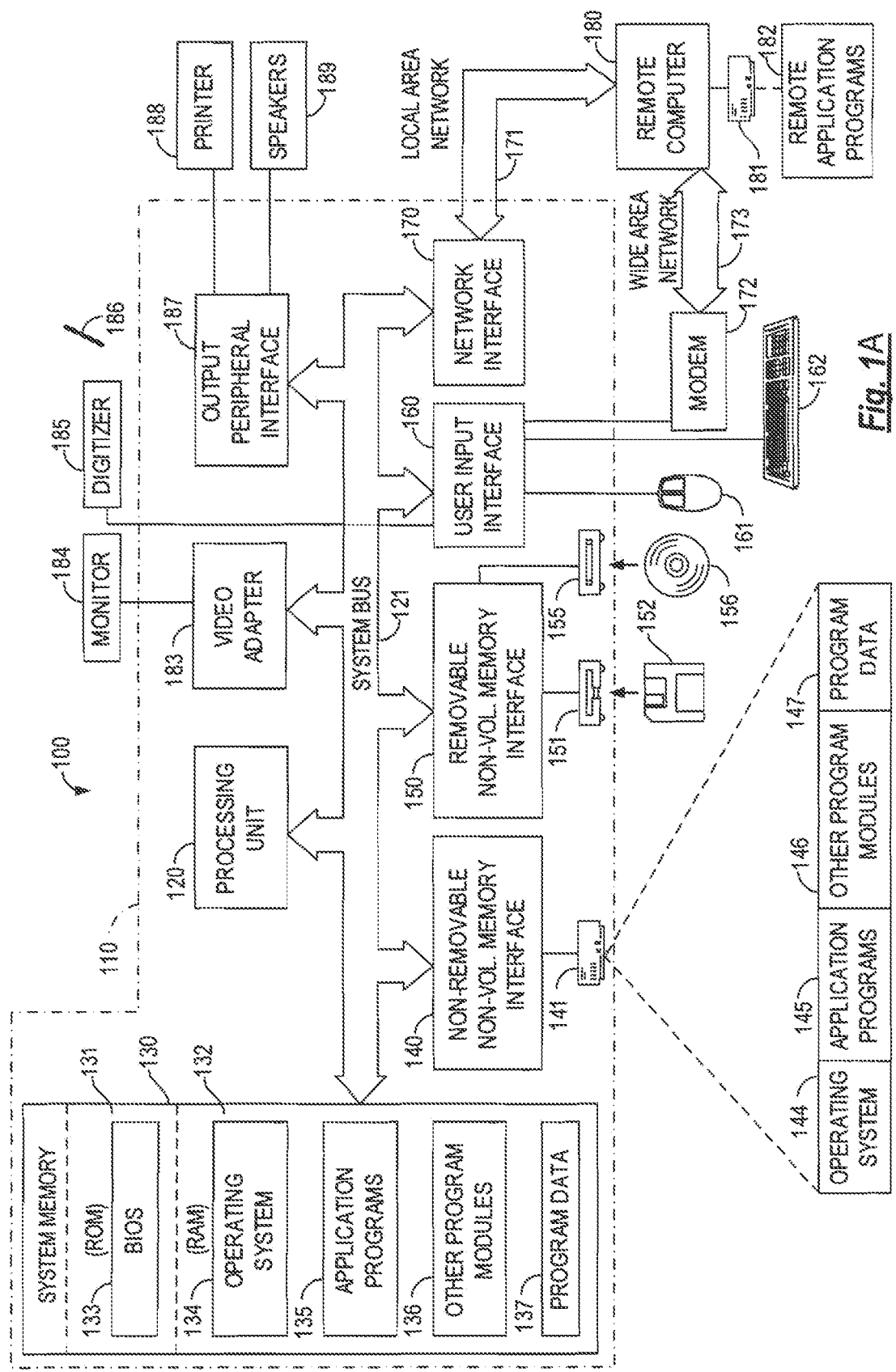

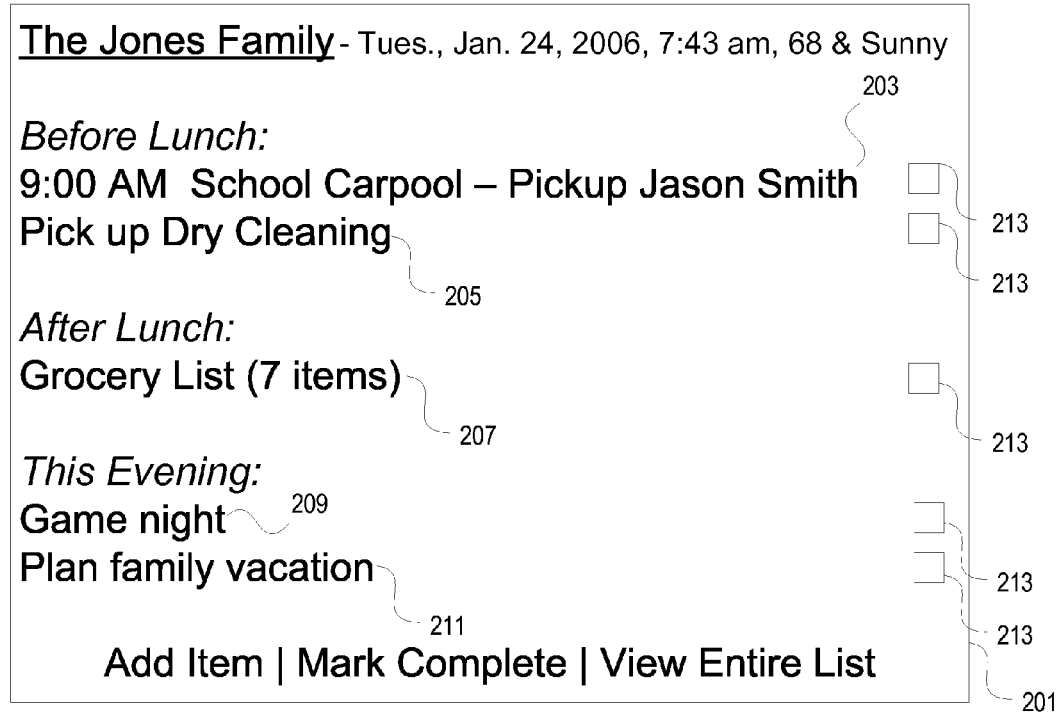

*FIG. 2*

| ID | TITLE | CREATE_DATE | DUE_DATE | PRIOR. | OWNER | TYPE |
|---|---|---|---|---|---|---|
| 1 | GROCERY LIST | 12-JAN-2006 | 24-JAN-2006 | H | MARSHA | LIST |
| 2 | GAME NIGHT | 10-OCT-2004 | TUESDAYS | H | FAMILY | EVENT |
| 3 | PLAN FAMILY VACATION | 12-DEC-2005 | 30-JAN-2006 | M | THOMAS | TASK |
| 4 | SCHOOL CARPOOL | 01-SEP-2005 | TUES./THUR. 9AM | H | MARSHA | EVENT |
| 5 | PICK UP DRY CLEANING | 17-JAN-2006 | 24-JAN-2006 | M | MARSHA | TASK |
| 6 | SCAN FAMILY PHOTOS | 01-JAN-2005 | NONE | L | THOMAS | TASK |
| 7 | HONEY-DO LIST | 11-NOV-2005 | 01-MAR-2006 | M | THOMAS | LIST |
| 8 | DINNER W/ JOHNSONS | 22-JAN-2006 | 28-JAN-2006 | M | FAMILY | EVENT |
| 9 | SOCCER PRACTICE | 01-JAN-2006 | WEDNESDAYS | H | JIMMY | EVENT |

*FIG. 3*

SELECTION OF ITEMS BASED ON RELATIVE IMPORTANCE

BACKGROUND

Personal information management (PIM) software has made great strides in recent years. People use PIM software everyday to manage their email, tasks, calendars, and contacts, among other information. Businesses rely heavily on PIM software as well. However, as users manage more and more information in PIM software, it becomes more difficult for users to ascertain critical information from non-critical information. That is, users suffer from information overload, and it becomes more difficult for users to differentiate what they need to know "right now," versus what can wait for some time in the future. In addition, while individuals may use PIM software for personal use, many users are reluctant to use PIM software in their personal lives, as opposed to their business or professional lives, because the use of PIM software in and of itself makes those users feel as if they are "at work."

Some PIM software applications have attempted to address the information overload problem by presenting users with a screen that attempts to present only currently relevant information. For example, the Microsoft® Outlook® brand PIM includes an "Outlook Today" view, which presents the user with three different lists, one each for upcoming calendar events, incomplete tasks, and a count of unread email messages. However, Microsoft® Outlook® does not filter the information to a degree useful to many users. For example, Microsoft® Outlook® displays all calendar events within the next 4 days, regardless of importance. If a user has more calendar events within the next 4 days than fit on the screen, Microsoft® Outlook® still lists them all, and the user must scroll the screen to review them. As another example, Microsoft® Outlook® displays all as yet unfinished tasks in the Outlook Today screen. Again, if more tasks are unfinished than fit on one screen, Microsoft® Outlook® still lists them all, and the user must scroll the screen to review them. Finally, with respect to email, Microsoft® Outlook® only lists the number of read and/or unread messages; the Outlook Today screen does not provide email subject or sender information. Thus, a user must review three different lists, and combine and filter the lists based on the user's own knowledge of each item, to figure out what is relevant information, because the Outlook Today screen does not provide a sufficiently filtered single list.

In addition to the above, many PIM software applications are not suited for a 10-second user interface. A 10-second user interface generally refers to a user interface where a user can learn the information he or she is looking for in an extremely short period of time, e.g., under a minute and, ideally, in about 10 seconds. Summary screens on current PIM software, such as the Outlook Today screen, are overloaded with information through which a user must parse, and are unsuitable for a 10-second user interface.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present invention are directed to a view that provides a user with a list of prioritized items regardless of whether each item is a task, an appointment, a link to a website to review, or a communication from some other person, or even some other item. The view may be prioritized according to what is deemed most important and what is urgent, optionally based also in part on the date the item was created. The view may present the information that the user most immediately needs to know. As items are added to a list, information is gathered that will allow the system to display those items when the user needs to see them. This information may be shown along with appointments that need to be attended in the near future. Other information such as pictures, web links, news feeds, tasks, or communication from another person may also be incorporated into the list of filtered information items.

A first aspect of the invention provides methods, systems, and/or computer readable media storing a method, for selecting heterogeneous items for display in a common list in an information management application. The method may include determining a relevance for each of multiple items based on a present date. The determination may be performed by comparing to the present date a creation date and due date for each of the items. The method may then select a subset of the items for output in a single list immediate view on a display based on the determining step.

Another illustrative aspect includes one or more computer readable media storing a database and computer executable instructions. The database stores multiple items, each item having a corresponding creation date and due date. The computer executable instructions when executed perform a method for selecting a subset of the items for display in a single list immediate view provided by an information manager software application. The method may include determining a relevance of each item by analyzing the creation date and the due date of each item with respect to a present date, selecting a subset of the items based on the analyzing step, and displaying the selected subset of the items in the single list immediate view on a video display device.

Other aspects of the invention select items for display in a common list in an information management application, by determining a relevance for item based on a present date, by comparing a creation date and due date for each of the items to the present date to determine which items have the smallest percentage of time remaining from the creation date to the due date. That subset if then displayed in a single list on a display. When an electronic communication is received from a member of a group to which a user of the information management application belongs, information corresponding to the received electronic communication is displayed on the single list based on the sender of the electronic communication belonging to the group, irrespective of whether the electronic communication otherwise would have had a relevance level warranting display in the single list.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein:

FIG. 1A illustrates a schematic diagram of a general-purpose digital computing environment in which certain aspects may be implemented.

FIG. 2 illustrates a screenshot of an immediate view according to an illustrative aspect of the invention.

FIG. 3 illustrates an item table usable in a database according to an illustrative aspect of the invention.

DETAILED DESCRIPTION

Figure 1B:
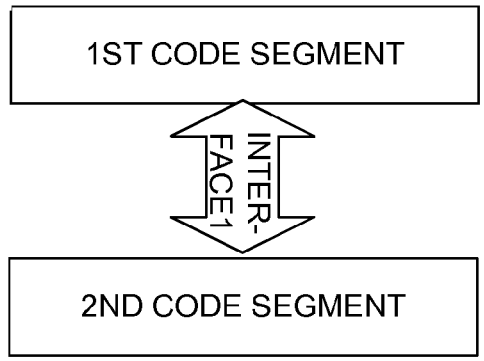
FIGS. 1B through 1M show a general-purpose computer environment supporting one or more aspects described here.

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Illustrative Operating Environment

FIG. 1A illustrates an example of a suitable general purpose computing system environment 100 on which one or more illustrative aspects may be implemented. The computing system environment 100 is only one example of a suitable computing environment and is not intended to suggest any limitation as to the scope of use or functionality of features described herein. Neither should the computing environment 100 be interpreted as having any dependency or requirement relating to any one or combination of components illustrated in the exemplary operating environment 100.

Aspects are operational with numerous other general purpose or special purpose computing system environments or configurations. Examples of well known computing systems, environments, and/or configurations that may be suitable for use with aspects of the invention include, but are not limited to, personal computers; server computers; portable and handheld devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the invention may be described in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

With reference to FIG. 1A, an illustrative system for implementing one or more aspects of the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 184 or other type of display device is also connected to the system bus 121 via an interface, such as a video interface 183. Computer 110 may also include a digitizer 185 for use in conjunction with monitor 184 to allow a user to provide input using a stylus input device 186. In addition to the monitor, computers may also include other peripheral output devices such as speakers 189 and printer 188, which may be connected through an output peripheral interface 187.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 182 as residing on memory device 181. It will be appreciated that the network connections shown are exemplary and other means of establishing a communications link between the computers may be used.

One or more aspects of the invention may be embodied in computer-executable instructions (i.e., software), such as in a notification manager software object, routine or function (collectively referred to herein as a notification manager) stored in system memory 130 or non-volatile memory 141, 152, 156 as application programs 135, 145, program modules 136, 146, and/or program data 137, 147. The software may alternatively be stored remotely, such as on remote computer 180 with remote application programs 182. Generally, program modules include routines, programs, objects, components, data structures, etc. that perform particular tasks or implement particular abstract data types when executed by a processor in a computer or other device. The computer executable instructions may be stored on a computer readable medium such as a hard disk 141, optical disk 156, removable storage media 152, solid state memory, RAM 132, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
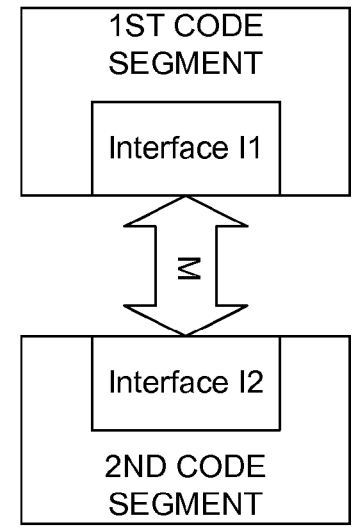

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the provided detailed description. There are, however, other ways to implement a programming interface, and, unless expressly excluded, these to are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

Figure 1D:
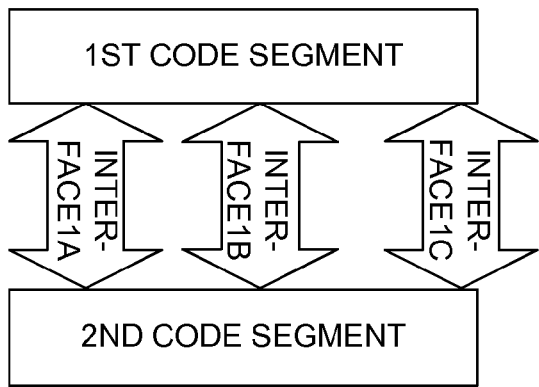
Figure 1E:
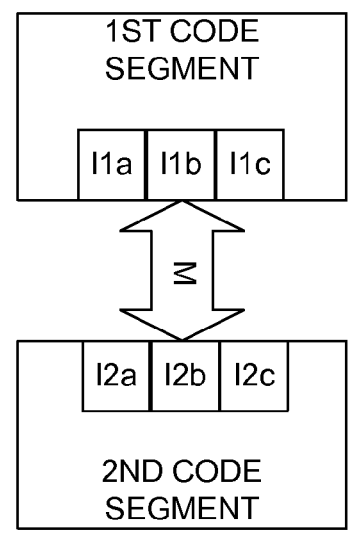

FACTORING: A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Figure 1F:
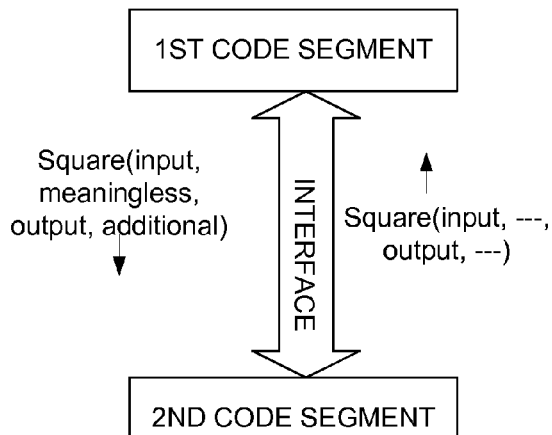
Figure 1G:
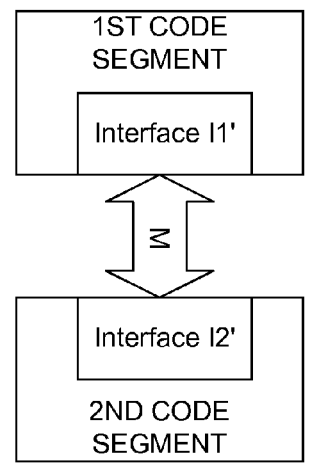

REDEFINITION: In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

Figure 1H:
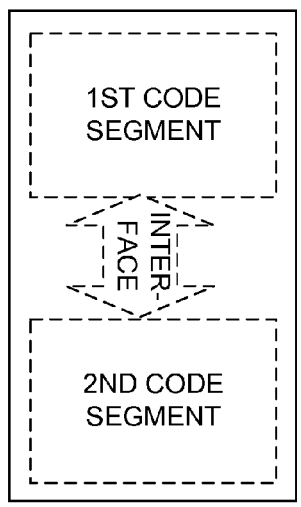
Figure 1I:
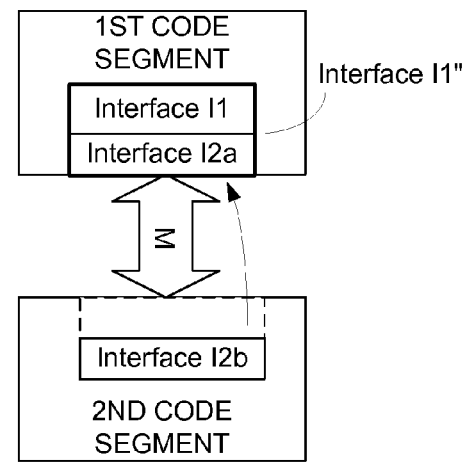

INLINE CODING: It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

Figure 1J:
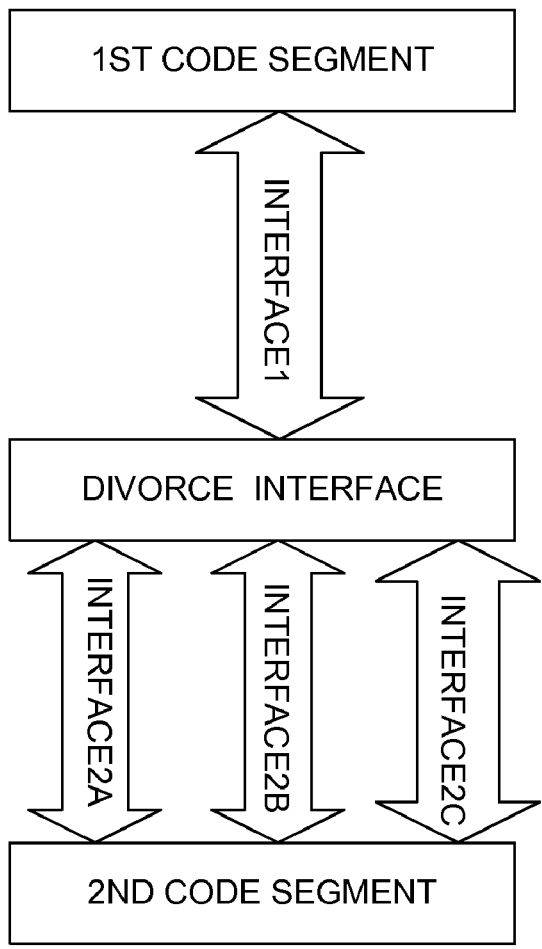
Figure 1K:
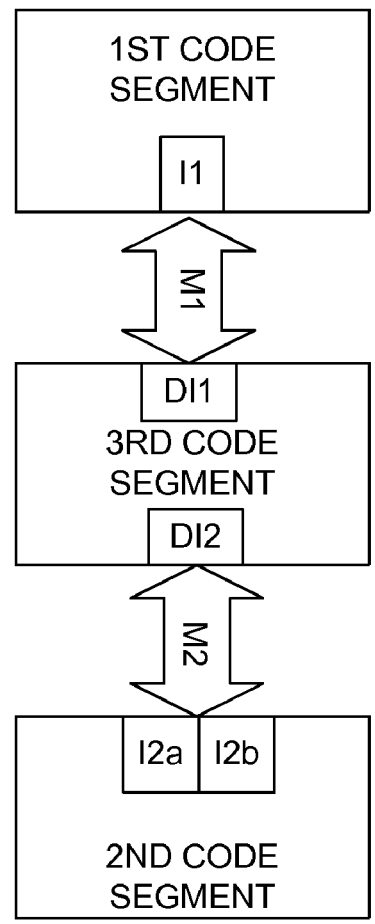

DIVORCE: A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

Figure 1L:
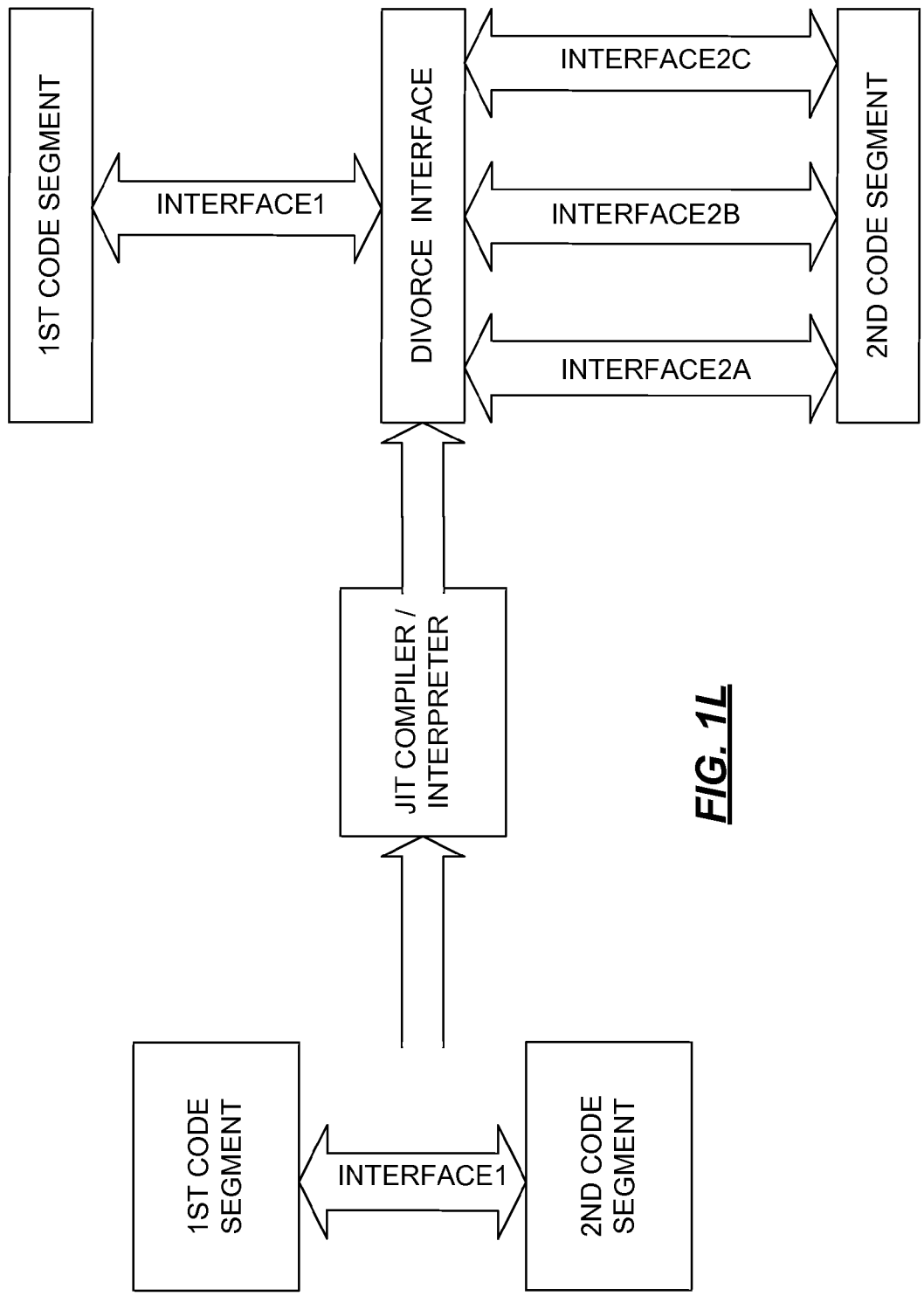
Figure 1M:
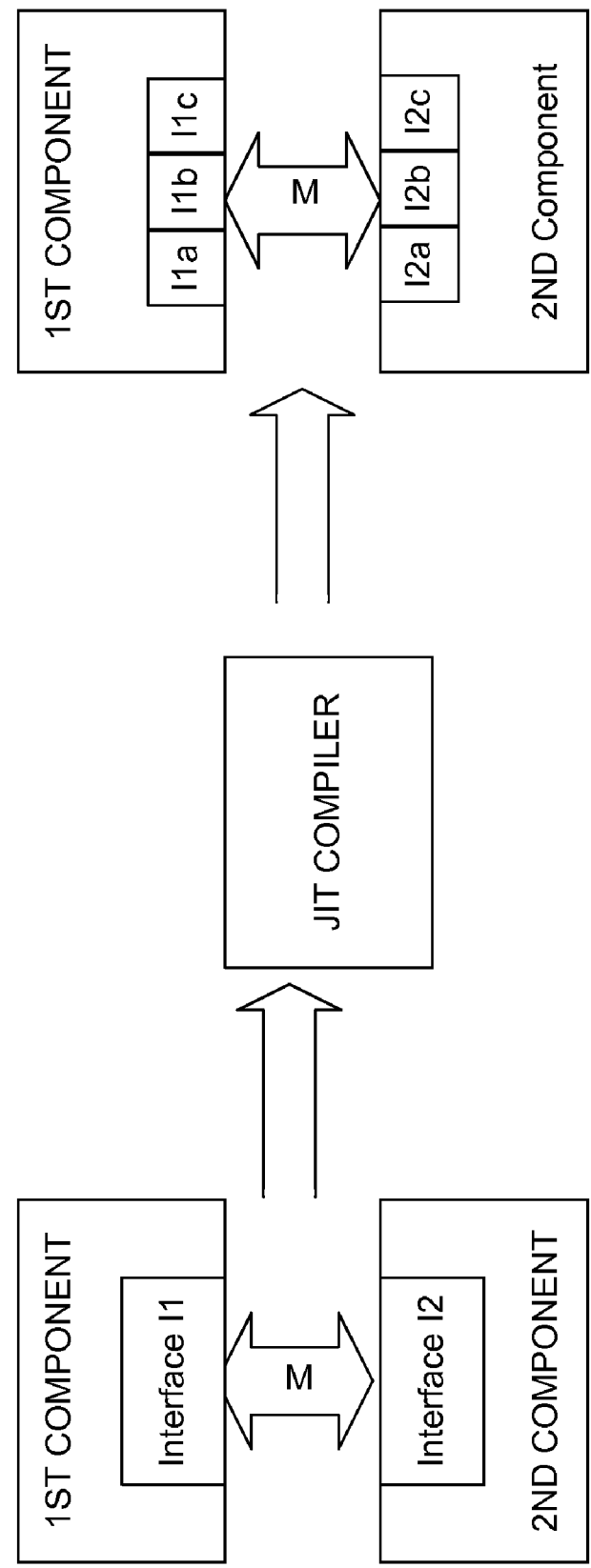

REWRITING: Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Illustrative Embodiments

Various aspects described herein are directed to methods and systems for the selection of items to be displayed in an immediate view of an information manager software application. As used herein, an information manager application refers to an application designed to manage personal, family, group, and/or business information, as well as communications. Examples of such software include personal information management (PIM) applications such as, but not limited to, Outlook® by Microsoft Corporation of Redmond, Wash., Lotus® Notes® by IBM Corp. of Armonk, N.Y., and GroupWise® by Novell, Inc. of Waltham, Mass. Other personal information management (PIM) applications may be used as well or instead, and such applications are not limited to merely personal information management, but may include family information management, business information management, group information management, and the like. All such software is generically referred to herein as PIM software 135, 145 or a PIM application 135, 145, e.g., residing in computer memory 140, and/or in system memory 130.

An immediate view refers to a particular view or screen display of information stored in the PIM software, filtered to present a user with a list of items selected based on the respective relative importance levels of the items. The immediate view may be a single list of items for display on a screen display having a 10-second user interface, such that the user can learn and/or identify time-critical items in a relatively short period of time, e.g., under a minute, and according to one aspect ideally in about ten (10) seconds. The immediate view may also be displayed on a 10-foot user interface, i.e., a user interface intended to be viewed and controlled from a distance farther than a typical location from which a user sitting in front of a desktop computer controls the desktop computer using a mouse and keyboard. A 10-foot user interface generally refers to a user interface for a television or other device where the user controls the device from across a room, and the 10-foot user interface generally includes larger fonts, larger graphics, larger selection areas, etc.

Items for display in the immediate view can include any item or object identified within the PIM software in use, where the item has a creation date, a due date, and a priority level. The due date and priority levels may be optional, as further discussed below. All items inherently have a creation date, based on the date they were instantiated. Examples of items include, but are not limited to, inter-user communications (e.g., email, instant message, etc.), calendar events, tasks, contacts, lists (e.g., grocery lists, honey-do lists, to-do lists, etc.), notes, web links, bills due, and the like. In addition, an item is not restricted to being only one of the aforementioned types. For example, a grocery list could be both a list and a task. The PIM software may represent the grocery list as a task having a list associated with it, or a list of individual tasks. The particular representation or type of an item is unimportant, provided that the item has a creation date, due date, and/or priority level, as discussed below. Each item may also be associated with an owner, e.g., the user or users responsible for completing that item.

FIG. 2 illustrates a screenshot of a sample immediate view 201. FIG. 2 illustrates an example immediate view having a 10-second user interface, whereby a user can quickly determine at a glance all items 203, 205, 207, 209, and 211 that need to be taken care of at a relevant time. Each item 203, 205, 207, 209, 211 may have a corresponding check box 213 that a user can select to mark the item as complete. In this example, the user is viewing immediate view 201 at 7:43 am on Tuesday, Jan. 24, 2006. The immediate view in this example displays items in "chunky time," meaning that each item is displayed under the general time of day in which it should be completed, e.g., before lunch, after lunch, this evening, etc. Chunky time may be user dependent. For example, morning, afternoon and evening may be used for one user, whereas "before school," "after school," and "after dinner" might be used for another. Chunky time may also group items in larger chunks of time, such as tomorrow, in a couple of days, next week, next weekend, next month, next year, next fall, next spring, etc. Alternatively, PIM software 135, 145 may display the immediate view in a time chronological view, where each item is associated with a specific due date and/or time. Priority may also or alternatively be used to order items. Items may optionally be displayed with an associated start time, e.g., as illustrated for item 203.

The immediate view 201 may also be considered to have a 10-foot user interface, depending on the size of the display screen on which it is displayed. That is, whether a user interface is a 10-foot user interface may depend on the screen size as compared to the amount of information displayed on the screen. For example, if the immediate view 201 is displayed on a screen having a 40-inch diagonal (e.g., a television set), immediate view 201 would certainly be considered to have at least a 10-foot user interface. However, if immediate view 201 is displayed on a screen having a 3-inch diagonal (e.g., a smartphone or PDA), then immediate view 201 would not be considered as having a 10-foot user interface. The size of the display screen, however, is secondary to the information selected for inclusion thereon.

As is evident in FIG. 2, immediate view 201 includes items of various types. However, as discussed above, the types of items included in the immediate view are secondary to the manner in which they are selected for inclusion in the immediate view. Because in most scenarios a PIM application will maintain and track more items than fit in an immediate view, the PIM software determines what items to include in the immediate view. Each item may be stored in an item database, e.g., in program data 147. PIM software selects items for display in the immediate view based on relative importance of each item, optionally modified by a user-defined importance level of each item.

FIG. 3 illustrates a sample database table 301 which may be used to store items. Table 301 is but one illustrative example, and other database tables may include more or fewer rows and/or columns storing different or additional information. For example, the Due_Date field may further include a time of day in which or by which the item preferably should be completed. Due_Date may alternatively be specified and/or displayed in terms of chunky time. The Priority (Prior.) field may include different or additional levels of priority, e.g., urgent/not urgent, instead of high (H), medium (M), low (L). Other priority levels may alternatively be used, e.g., "must do," "optional," and "none." The Type field may include additional or different types of items, e.g., communications, link, etc.

Table 301 stores the items displayed in immediate view 201, as well as additional items that the system filtered out of immediate view 201 based on the principles described herein. In table 301, record 1 corresponds to item 207; record 2 corresponds to item 209; record 3 corresponds to item 211; record 4 corresponds to item 203; and record 5 corresponds to item 205. Records 6-9 corresponds to items filtered out of immediate view 201, as further described below.

PIM software 135, 145 (or some other software module) analyzes each item to determine whether to display each item in immediate view 201. At a high level, the decision is based in part on a comparison of when the item was created versus when the item is due, optionally based further on the item's priority. PIM software 135, 145 ranks items based on the results of the comparison. According to one illustrative aspect, PIM software 135, 145 may determine a percentage of time left to complete an item versus when the item was created. The highest ranking items then may be selected for display in immediate view 201.

As illustrated in FIGS. 2-3, on Jan. 24, 2006, PIM software 135, 145 might determine that the item defined in record 1 has 0% time remaining, because Jan. 24, 2006, is its due date. Record 5, also due on Jan. 24, 2006, also has 0% time remaining. Similarly, record 2 reoccurs every Tuesday, and Jan. 24, 2006, is a Tuesday, so record 2 also has 0% remaining. Record 3 has 12% of the time remaining from when the item was created, as compared to when the item is due. Record 4, which occurs every Tuesday and Thursday, also has 0%. Record 6 has no due date, and thus may be determined to have 100% time remaining. Record 7 has 32% time remaining. Record 8 has 66% time remaining. Record 9 may require special handling, as it occurs every Wednesday. The time remaining for recurring items may be determined based on the original creation date, or based on the last occurrence of the item. That is, the creation date for the item may be reset periodically to be the date of the most recent occurrence. Using this logic, record 9 has a time remaining of 14%. PIM software 135, 145 may include in immediate view 201 those items having the lowest percentages of time remaining. Immediate view 201 depicted in FIG. 2 illustrates the 5 items having the lowest percentages of time remaining. Only five items are included in this example because only 5 items fit under the three different chunks of time in the example of FIG. 2.

PIM software 135, 145 may also incorporate the priority of an item into the determination of whether to include the item in immediate view 201. For example, PIM software 135, 145 may create an adjusted time value based on the priority level. PIM software 135, 145 may adjust the percentage time remaining down when the priority is high, creating a smaller adjusted time value than the original percentage time remaining, thereby increasing the chance that the item is included in immediate view 201. PIM software 135, 145 may adjust the percentage time remaining up when the priority is low, creating a larger adjusted time value than the original percentage time remaining, thereby decreasing the chance that the item is included in immediate view 201. PIM software 135, 145 might not adjust the percentage time remaining at all when the priority is medium, creating an adjusted time value equal to the original percentage time remaining.

Figure 4:
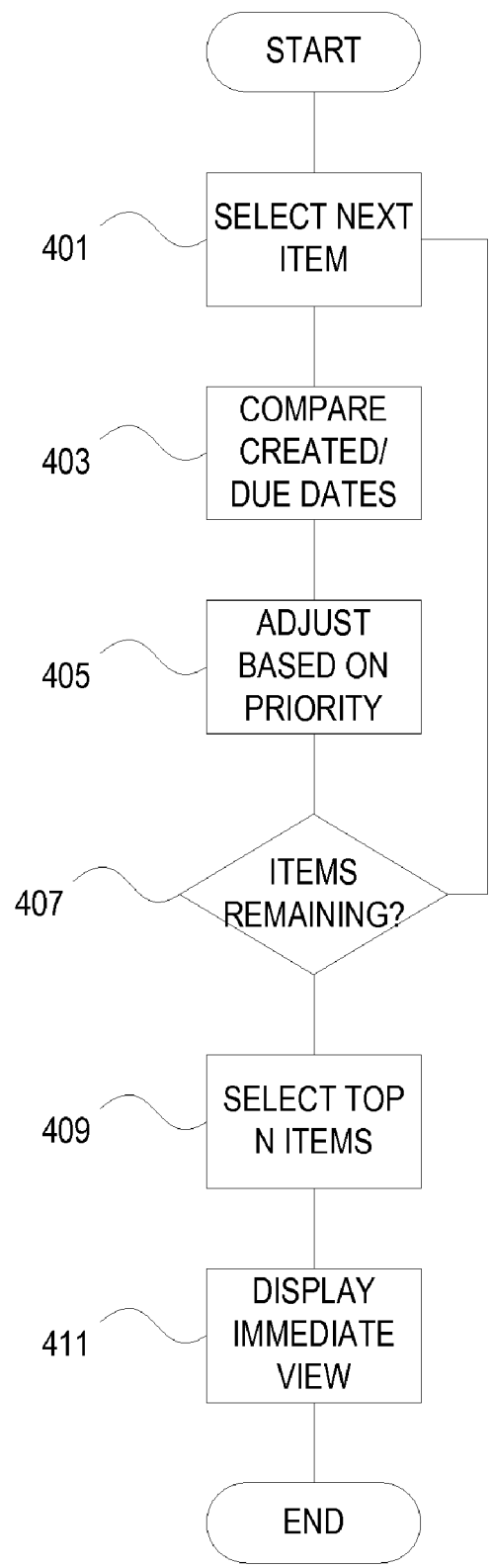
FIG. 4 illustrates a method for analyzing items according to an illustrative aspect of the invention.

FIG. 4 illustrates a flowchart of one possible software algorithm to perform the above-described illustrative methodology, e.g., which PIM software performs in real time, once per day, once per display of immediate view 201, or on some other predetermined or user-requested basis. In step 401 the first/next item is selected for analysis. In step 403, PIM software 135, 145 analyzes the created/due dates to determine the percentage time remaining. In step 405, PIM software 135, 145 optionally creates an adjusted time value by adjusting the percentage time remaining based on the priority of the item. In step 407, PIM software 135, 145 determines if any items remain to be analyzed and, if so, returns to step 401 to analyze the next item. If all items have been analyzed, PIM software 135, 145, in step 409, selects the top N items to display in immediate view 201, where N is the number of items that will fit in immediate view 201. Thereafter, in step 411, the PIM software 135, 145 displays the N items in immediate view 201.

Other algorithms may alternatively be used, where the decision whether an item is displayed in the immediate view 201 is based on some combination of an analysis of the creation date, the due date, and/or further adjusted or altered based on priority. For example, PIM software 135, 145 might display higher priority items at the top of the list, instead of grouping items in chunky time as shown in FIG. 2, or PIM software 135, 145 might simply list items chronologically, regardless of priority. PIM software 135, 145 may increase the priority of an item as the due date nears. For example, if an item has less than X % (e.g., 20%) time remaining, PIM software 135, 145 might increase the priority level one increment, or change the item from non-urgent to urgent. In still another alternative, PIM software 135, 145 might select all items having less than Y % time remaining for display in immediate view 201, where Y is some predetermined or user selected value (e.g., 25%).

According to an illustrative aspect, PIM software 135, 145 might only include items for display in immediate view 201 when the items meet minimum threshold criteria, regardless of whether enough items meet those criteria to fill up immediate view 201. If only a single item meets the minimum threshold criteria, then only that item would be displayed in immediate view 201. The Y % criteria discussed above is one such illustration of a minimum threshold criteria which could be used. In other embodiments, PIM software 135, 145 keeps selecting additional items until immediate view 201 is full or otherwise meets some predefined minimum number of items. In one embodiment, all items that are due to be done 'today' are shown. If, after selecting all items due 'today,' there is room left in immediate view 201 for additional items, any algorithm may be used to determine which items and when those items may appear in the immediate view. For example, a 'must do' task that was assigned to be completed next week may appear on the list some days prior to the end of that assigned time period. In yet another alternative, if there are no 'must do' or high priority tasks remaining for the current day to display in immediate view 201, immediate view 201 or a portion thereof may remain empty, thereby communicating to the user than no high priority or 'must do' tasks remain for the day. If there are more items to display than immediate view 201 has room to display, immediate view 201 may include a numeric or graphical indicator indicating that additional items exist, and/or how many additional items remain. In some embodiments, immediate view 201 may be divided into sections, e.g., a 'must do' section and another section representing other, not-as-critical items, such as in a calendar format as illustrated in FIGS. 5 and 6.

Figure 5:
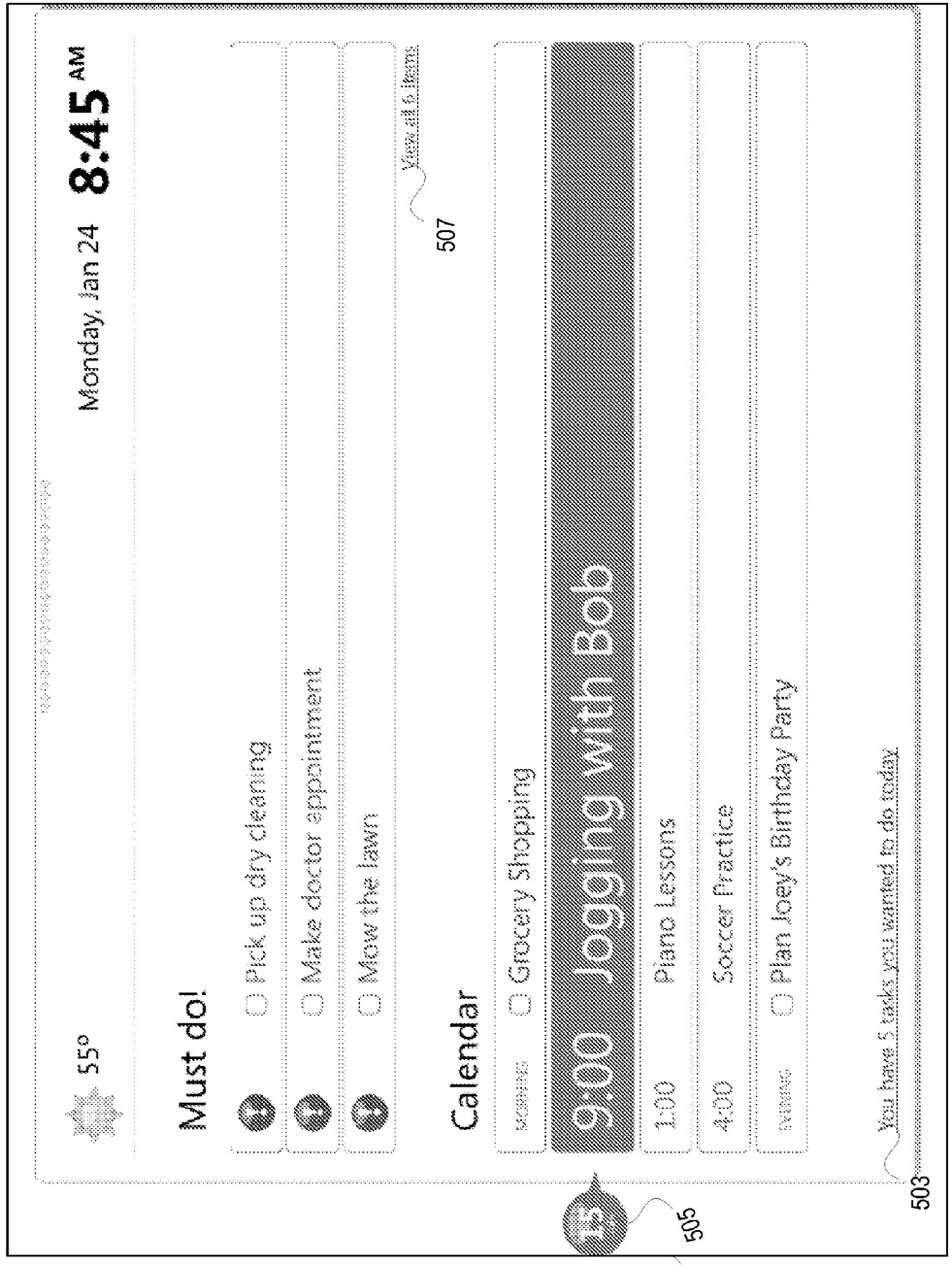
FIG. 5 illustrates a screenshot of an immediate view according to an illustrative aspect of the invention.
Figure 6:
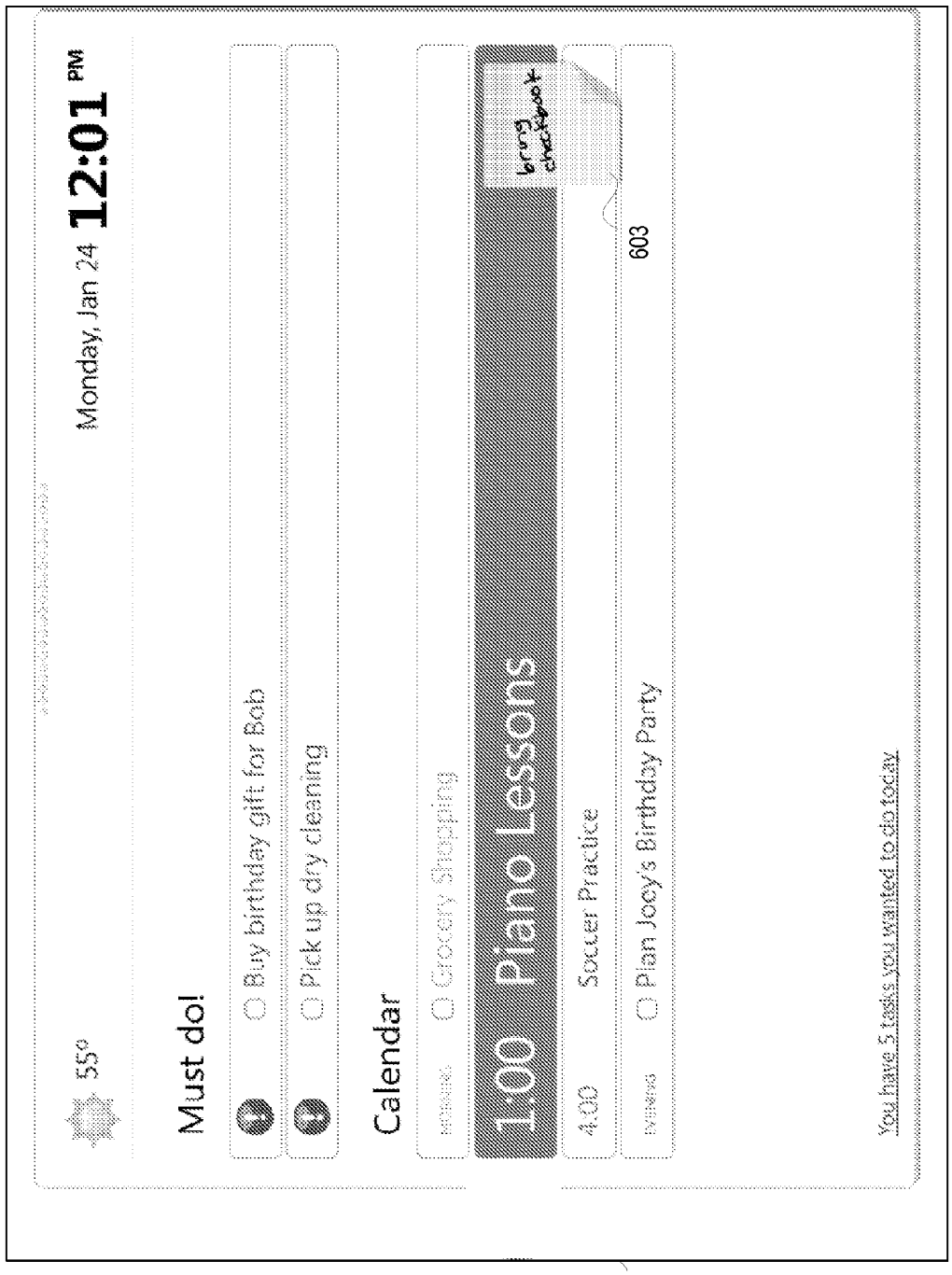
FIG. 6 illustrates another screenshot of an immediate view according to an illustrative aspect of the invention.

With reference to FIGS. 5 and 6, Table 1, below, illustrates an example of a 24-hour scenario with hypothetical user actions and system responses according to one or more illustrative aspects described herein. Immediate view 501, in this example, includes a tasks (i.e., 'must do') section and a calendar section. In Table 1, italics represent items displayed with less prominence relative to other items.

TABLE 1

| USER ACTION | SYSTEM RESPONSE |
|---|---|
| | At 12:01 am, immediate view refreshes for the new day. There are 3 tasks already in the 'must do' task section:<br>Pick up dry cleaning<br>Make doctor appointment<br>Mow the lawn<br>Those tasks remain in that section unchanged.<br>Appointments for the new day are added to the calendar section:<br>9 am - Jogging with Bob<br>1 pm - Piano Lessons<br>4 pm - Soccer Practice<br>Tasks that have a due date for this day and also have time specific to the morning, afternoon or evening are also added to the list relative to the appointment times in place. The calendar list now appears like this:<br>9 am - Jogging with Bob<br>Grocery Shopping<br>1 pm - Piano Lessons<br>4 pm - Soccer Practice<br>Plan Joey's Birthday Party<br>There are 5 other tasks with a due date of today. There is a link 503 to a list of these items. This list is generated by pulling due date information from all the lists created by the user.<br>"You have 5 tasks you wanted to do today" |
| 8:45 am - user looks at the immediate view, illustrated in FIG. 5. | 9 am - Jogging with Bob has an indicator 505 next to it to show the user there are 15 more minutes before the start of this appointment. If location information had been provided, the indicator may have appeared earlier to show the travel time plus 15 minutes. Immediate View looks |

TABLE 1-continued

| USER ACTION | SYSTEM RESPONSE |
|---|---|
| | like this:<br>Pick up dry cleaning<br>Make doctor appointment<br>Mow the lawn<br>View all six items (507)<br>9 am - Jogging with Bob<br>Grocery Shopping<br>1 pm - Piano Lessons<br>4 pm - Soccer Practice<br>Plan Joey's Birthday Party<br>You have 5 tasks you wanted to do today |
| 8:45 am-9:00 am | Time Left indicator counts down the minutes until the appointment is to start. |
| 9:45 am | 9 am - Jogging with Bob loses emphasis:<br>Pick up dry cleaning<br>Make doctor appointment<br>Mow the lawn<br>View all six items (507)<br>*9 am - Jogging with Bob*<br>Grocery Shopping<br>1 pm - Piano Lessons<br>4 pm - Soccer Practice<br>Plan Joey's Birthday Party<br>You have 5 tasks you wanted to do today |
| 10:30 am | 9 am - Jogging with Bob is removed from the immediate view. Remaining items move up in the list. Immediate View now appears like this:<br>Pick up dry cleaning<br>Make doctor appointment<br>Mow the lawn<br>View all six items (507)<br>Grocery Shopping<br>1 pm - Piano Lessons<br>4 pm - Soccer Practice<br>Plan Joey's Birthday Party<br>You have 5 tasks you wanted to do today |
| 10:55 am | A new task appears in the immediate view based on chunky time algorithm and 'must do' priority. Immediate view now appears like this:<br>Pick up dry cleaning<br>Make doctor appointment<br>Buy Birthday Gift for Bob<br>Grocery Shopping<br>1 pm - Piano Lessons<br>4 pm - Soccer Practice<br>Plan Joey's Birthday Party<br>You have 5 tasks you wanted to do today |
| 12:01 pm, illustrated in FIG. 6. The user has made his or her doctor appointment. | The morning is over but the grocery shopping task has not been checked off. It loses emphasis but remains in the immediate view:<br>Pick up dry cleaning<br>Buy Birthday Gift for Bob<br>*Grocery Shopping*<br>1 pm - Piano Lessons<br>4 pm - Soccer Practice<br>Plan Joey's Birthday Party<br>You have 5 tasks you wanted to do today |
| 12:17 pm | A new task appears in the immediate view based on chunky time algorithm and "must do" priority. Task section now has 4 items:<br>Pick up dry cleaning<br>Buy Birthday Gift for Bob<br>Bring snacks to soccer practice<br>Because there are now 4 items and only 3 can be shown, the four items may rotate in the view, changing every 5 seconds. An indicator may also highlight the fact that there are 4 items even though the user only sees three. There may also be a scroll button that allows the user to manually scroll through the 'must do' items. |
| User clicks on the indicator that tells them they have 4 'must do' items. | PIM software generates a list of all the must do items in the order in which they appear in the PIM software, starting with |

TABLE 1-continued

| USER ACTION | SYSTEM RESPONSE |
|---|---|
| | the oldest item and ending with the newest item. This list functions like any other list but is not saved or part of the user's list of lists. If an item on the list refers to an entire list, selecting that list will take the user to that particular list. In this example, no editing can be done on the list. The only actions available are to check off items from the list, close the list or go to the detail for the list or list item at which point further action can be taken. |
| User walks away from the list. | After 5 minutes of no interaction with the PIM, the generated list of 'must do' items disappears. |
| 12:35 pm | 1 pm - Piano Lessons has an indicator next to it to show the user there are 25 more minutes before the start of this appointment. Because the PIM is aware of the location of the piano lesson to home, it knows it will take 10 minutes to get there so the indicator appears 15 minutes before the time when you should leave for the appointment. If no location information is known, the indicator will appear 15 minutes ahead of time. The user makes a note that payment is due to the piano instructor, and the note 603 appears with the piano lesson item. |
| 12:35 pm-1:00 pm | Time Left indicator counts down the minutes until the appointment is to start. |
| 1:45 pm | 1 pm - Piano Lessons loses emphasis. Immediate View appears like this:<br>Pick up dry cleaning<br>Buy Birthday Gift for Bob<br>Bring snacks to soccer practice<br>Grocery Shopping<br>1 pm - Piano Lessons<br>4 pm - Soccer Practice<br>Plan Joey's Birthday Party<br>You have 5 tasks you wanted to do today |
| 2:30 pm | 1 pm - Piano Lessons is removed from the immediate view:<br>Buy Birthday Gift for Bob<br>Bring snacks to soccer practice<br>Grocery Shopping<br>4 pm - Soccer Practice<br>Plan Joey's Birthday Party<br>You have 5 tasks you wanted to do today |
| That afternoon, user puts a check mark in the box next to "Grocery Shopping" | Grocery Shopping has a check appearing next to the item. 15 minutes later, it is removed from the list. Immediate View appears like this:<br>Buy Birthday Gift for Bob<br>Bring snacks to soccer practice<br>Pick up dry cleaning<br>4 pm - Soccer Practice<br>Plan Joey's Birthday Party<br>You have 5 tasks you wanted to do today |
| 3:15 pm | 4 pm - Soccer Practice has an indicator next to it to show the user there are 45 more minutes before the start of the appointment. The PIM considers the 30 minute travel time based on location and adds 15 minutes to that estimate. |
| 5:00 pm | 4 pm - Soccer Practice loses emphasis. At the bottom of the calendar section of the screen but above the link to today's tasks, tomorrow's date is inserted and all of tomorrow's appointments until 12 pm and all morning tasks are listed as appropriate in the immediate view:<br>Buy Birthday Gift for Bob<br>Bring snacks to soccer practice<br>Pick up dry cleaning<br>4 pm - Soccer Practice<br>Plan Joey's Birthday Party<br>Next Day Date: |

TABLE 1-continued

| USER ACTION | SYSTEM RESPONSE |
|---|---|
| | 8 am - Dentist<br>Give dog a bath<br>11:30 am - Lunch with Suzan<br>You have 5 tasks you wanted to do today |
| 6:30 pm | 4 pm - Soccer Practice is removed from the immediate view. Immediate View appears like this:<br>Pick up dry cleaning<br>Buy Birthday Gift for Bob<br>Bring snacks to soccer practice<br>Plan Joey's Birthday Party<br>Next Day Date:<br>8 am - Dentist<br>Give dog a bath<br>11:30 am - Lunch with Suzan<br>You have 5 tasks you wanted to do today |
| 7:30 pm, a text message is sent to the PIM from a cell phone. | Text message appears at the top of the priority item section. It shows who the message is from, has an indicator that it is a message, rather than a task. It also show who the message is for. The three tasks now scroll through the remaining 2 spots. The Immediate View looks like this:<br>** Mom, Please pick me up at Sarah's<br>Pick up dry cleaning<br>Buy Birthday Gift for Bob<br>Bring snacks to soccer practice<br>Plan Joey's Birthday Party<br>Next Day Date:<br>8 am - Dentist<br>Give dog a bath<br>11:30 am - Lunch with Suzan<br>You have 5 tasks you wanted to do today |
| 8:00 pm, user looks at scrolling list. The task they wanted scrolls off as they were about to check it. Rather than waiting for it to appear again, user uses scroll button to make "Bring snacks to soccer practice" appear in scrolling list. | List stays frozen for 20 seconds waiting for the user to either check something or walk away from immediate view. |
| User checks off "Bring snacks to soccer practice" from the list. User also checks off the message that had been sent. | The message item disappears within 15 sections. The list item loses emphasis and displays a check mark. The remaining items scroll through the active task spots remaining. |
| 8:15 pm | Bring snacks to soccer practice is removed from the immediate view. Only 2 items are now shown:<br>Pick up dry cleaning<br>Buy Birthday Gift for Bob<br>Plan Joey's Birthday Party<br>Next Day Date:<br>8 am - Dentist<br>Give dog a bath<br>11:30 am - Lunch with Suzan<br>You have 5 tasks you wanted to do today |
| Midnight | Plan Joey's Birthday Party was never checked off the list but this item is removed from the view. Calendar section becomes a one day view again. Task section remains unchanged. Immediate View looks like this:<br>Pick up dry cleaning<br>Buy Birthday Gift for Bob<br>8 am - Dentist<br>Give dog a bath<br>11:30 am - Lunch with Suzan<br>You have 2 tasks you wanted to do today |

As illustrated above, PIM software 135, 145 might age items off the list when their due date/time has passed. Alternatively, PIM software waits for the user to mark items complete before ageing the item off the immediate view. PIM software 135, 145 might assume that once an item's due date/time has passed, the user has taken care of that item or no longer needs to know about the item. Thus, PIM software 135, 145 may update the immediate view 201 in real-time to always display applicable items. The user can review the aged item in a separate, more detailed PIM view, the details of which are not relevant herein.

As indicated above, an item need not have a due date. PIM software 135, 145 might handle such items in a variety of ways. According to one illustrative aspect, PIM software 135, 145 might assign an item without a user assigned due date an arbitrary due date, e.g., one or two months/years from the date of creation, and the item is then processed as described above. According to another illustrative aspect, an item without a user assigned due date might be precluded from appearing on the immediate view, and a user could thus only review that item in a separate, more detailed view.

In still yet another embodiment, PIM software 135, 145 might only include an item without a due date in immediate view 201 when there is space remaining in the immediate view after selection of other items meeting the minimum threshold criteria discussed above. PIM software 135, 145 might "suggest" items without due dates to the user when there is space available in immediate view 201. The implication being that if immediate view 201 is not full, then the user might have room in his/her schedule to work on one of the items not having a due date. Alternatively, where items are displayed in chunky time, PIM software 135, 145 might include an item without a due date in a chunk of time (e.g., morning, afternoon, evening) in which there are no items otherwise displayed, or less than a predetermined number of items. In immediate view 501, PIM software 135, 145 might never add items to the "must do" section unless the items must be completed that day. In this manner the user knows that if the "must do" section is empty, then there are no time-sensitive or critical items remaining for that day. If time and/or space is available in the calendar section of immediate view 501, PIM software might suggest items in the calendar section. For example, if the calendar is empty for an evening, PIM software 135, 145 might suggest the user work on a previous entered long term project, such as scanning in family photos or ripping the user's CD collection to his or her computer for personal private noncommercial use.

PIM software 135, 145 might also include additional features or data in immediate view 201. For example, as shown in FIG. 2 and FIGS. 5-6, PIM software 135, 145 might include the current date and time, and also an indication of the day's weather. Weather may be obtained using any of a variety of web services over the Internet. The indication of the weather is particularly useful in that it assists the user in determining which items are feasible to complete or not complete when they are weather dependent. For example, when the item corresponding to FIG. 3, record 9 (soccer practice) is displayed, an indication that the weather is rainy might prompt the user to check to see if soccer practice has been canceled. Alternatively, at the time of creation of an item (or while editing an item), a user might indicate whether the item is weather-dependent, and optionally what type of weather is preferred. For example, a user might indicate that the desired weather for soccer practice is "not raining," while the desired weather for "school carpool" is "not precipitating and not freezing." Desired weather for "ski vacation" might be "snowing," and the desired weather for "get suntan" might be "sunny and hotter than 80 degrees Fahrenheit." When an item is weather-dependent and that item is displayed in immediate view 201, PIM software 135, 145 might raise an alert or flag to notify the user that the weather is adverse to the desired weather for that item, so the user can take appropriate action if necessary. In addition to date, time, and weather, PIM software 135, 145 may also or alternatively display other information, such as real-time data received over a network, RSS feeds, and the like.

PIM software 135, 145 might also include in immediate view 201 an indication of new communications, e.g., by displaying an envelope or other icon along with a number of new emails, instant messages, or other communications. PIM software 135, 145 may further display a visualization or animation when an event occurs, e.g., a new email or message is received. If the newly received communication meets the criteria to be included in immediate view 201, PIM software 135, 145 may also include the newly received message in immediate view 201, based on a creation date, due date, and/or priority included in the message. Alternatively, as illustrated in Table 1, an incoming communication might always be immediately displayed as a high-priority item, or the incoming communication might be given a priority based on the sender or content of the incoming communication. For example, where PIM software 135, 145 is used in a group or family environment, the incoming communication might only receive a high priority, or be immediately displayed, where the sender is part of the recipient's family or group, respectively. Thus, if the PIM software 135, 145 is in use by a group such as a Boy Scout troop, then an incoming communication from another member of the Boy Scout troop might be given high priority and immediately be displayed in the immediate view, whereas an incoming communication from a friend or acquaintance not in the Boy Scout troop might be routed to a conventional electronic communication inbox that the recipient can check at his or her leisure.

In some embodiments, PIM software 135, 145 may be usable with multiple groups and sub-groups. For example, the primary users of PIM software 135, 145 might include the members of a family (e.g., mother, father, child1, and child2). The family may be referred to as the primary group. Each member of the primary group may also belong to one or more other groups, such as a dinner club, Boy Scout troop, soccer team, dance team, etc. When an incoming communication is received, PIM software 135, 145 might display not only who the communication is directed to, but also the group to which it pertains. Thus, suppose that child1 has Dance Rehearsal at 8 pm listed on the calendar section of immediate view 501. When the Dance Rehearsal item was created, the user indicated to PIM software 135, 145 that Dance Rehearsal is related to the Dance Team group. If an incoming communication is received from any other member of the Dance Team prior to Dance Rehearsal, PIM software 135, 145 may display the incoming communication as high priority and/or on the "must do" list, and may flag the Dance Rehearsal item as having a related communication. The recipient user (e.g., child1 or the parents) can then immediately review the incoming communication by selecting the item from the "must do" list. Group set up and administration may be handled by any variety of techniques. For example, group email lists or groups of contacts can be used as the basis to define a group. As another example, when members of a common group (e.g., a family) use a common instance of PIM software 135, 145, when one member of the group, creates, deletes, or updates an item, the other modification may be automatically appear to the views provided to other members of the group using the same instance of the PIM software.

As indicated above, each item may include a field indicating an owner or user responsible for completing the item, or multiple users/owners for an item. Such a field is useful, e.g., when the PIM software manages information for a group of individuals collectively, such as a family or organization (e.g., a Boy Scout troop). PIM software 135, 145 may include an indication of the owner of each item in immediate view 201. PIM software 135, 145 may color code items depending on owner, or provide some other graphical or textual indication of the owner. Each member of the group can thus quickly view not only their own items, but also those items of other members of the group, and easily determine which items are relevant to each user (e.g., soccer practice may include a parent and child in the family).

Thus, using one or more of the above-described aspects, PIM software can determine what a user needs to know at the present date/time, in real-time, e.g., right now. The PIM software provides, in the immediate view, a single list of items of multiple types, integrated in one view, based on aging and/or prioritization characteristics of each item. Aspects may be used to prioritize tasks based on whether they are "must do" or "optional," or if they have not been given either of these classifications (e.g., medium priority above). The combination of the time element and priority allows the PIM software 135, 145 to display the items that should and/or need to be done very soon. Items thus appear in the context of the day when they need to be seen, where items that have been prioritized to the top of the list are displayed in the immediate view.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for use on a computer executing computer executable instructions for selecting a plurality of heterogeneous items of various types for display in an immediate view in a user interface of an information management application, said immediate view capable of displaying a preset number of heterogeneous items of various types, said user interface displayed on a computer display device connected to the computer, said method comprising:
   a) establishing user defined headings for the immediate view according to chunky time, wherein chunky time is a general time of day corresponding to when items should be completed and wherein each heading indicates when the items listed thereunder should be completed;
   b) storing items in a database, each item associated with a creation date, a due date, and a priority level, wherein the priority level is based on previously user defined priorities and further wherein not all items in the database have values for each of the due date and the priority level;
   c) selecting from the stored items in the database N items for display by:
      analyzing each selected item based in part on a present date and a comparison of creation date, due date, and priority level to determine a relative importance of each selected item;
      ranking the selected items based on the relative importance to form a ranked list;
      selecting N items from the top of the ranked list based on the preset number, wherein the preset number is the maximum number of items capable of being displayed in the immediate view and further wherein the selected N items may be less than or equal in number to the preset number;
   d) displaying the selected N items in the immediate view under the user defined heading corresponding to the chunky time based on when it is determined the item should be completed, wherein:
      i) if the selected N items are equal to the present number, then displaying the selected N items in the immediate view, wherein the displayed selected items in the immediate view include at least one task, at least one list, and at least one calendar event, wherein in each item is displayed according to its corresponding chunky time; or
      ii) if the selected N items are less than the preset number, then displaying the selected N items in the immediate view, wherein the displayed selected items in the immediate view include at least one task, at least one list, and at least one calendar event, wherein in each item is displayed according to its corresponding chunky time and additionally displaying in the immediate view one or more items not having a due date;
   e) repeating c and d on a predetermined basis in order to update the immediate view.

2. The method of claim 1, wherein said selecting step further comprises, for each item, adjusting the relevance when the each item has a predetermined priority level.

3. The method of claim 1, wherein the relevance comprises a percentage of time remaining for each item from the creation date to the due date based on the present date.

4. The method of claim 1, wherein each of the plurality of items has a corresponding priority level, and wherein the method further comprises elevating the priority level as the due date approaches.

5. The method of claim 1, wherein the plurality of items comprises items corresponding to a plurality of users.

6. The method of claim 1, further comprising displaying with the immediate view daily weather information corresponding to the present date wherein each item specifying a type of weather preferred indicating that the item is weather-dependent.

7. The method of claim 6, further comprising:
   receiving the daily weather information for the present date;
   displaying an alert for each item in subset of the plurality of items when the daily weather information indicates weather contrary to the specified type of weather preferred of said item.

8. The method of claim 1, further comprising displaying an RSS feed with the immediate view.

9. The method of claim 1, further comprising the steps of:
   f) receiving an electronic communication from a member of the group to which the user of the information management application belongs; and
   g) displaying on the computer display device in the immediate view, information corresponding to the received electronic communication based on the at least one item related to the group being listed in the immediate view.

10. One or more computer readable storage media storing data comprising:
   a database of a plurality of items of various types, each item having a corresponding creation date and due date;
   computer executable instructions, which when executed on a computer, cause the computer to perform a method for selecting a subset of the plurality of items of various types for display in immediate view provided by an information manager software application, said immediate view capable of displaying a preset number of heterogeneous items of various types, said method comprising steps of:

a) establishing user defined headings for the immediate view according to chunky time, wherein chunky time is a general time of day corresponding to when items should be completed and wherein each heading indicates when the items listed thereunder should be completed;

b) storing items in a database, each item associated with a creation date, a due date, and a priority level, wherein the priority level is based on previously user defined priorities and further wherein not all items in the database have values for each of the due date and the priority level, and wherein each item specifies a type of weather preferred indicating that the item is weather-dependent;

c) selecting from the stored items in the database N items for display by:

analyzing each selected item based in part on a present date and a comparison of creation date, due date, and priority level to determine a relative importance of each selected item;

ranking the selected items based on the relative importance to form a ranked list;

selecting N items from the top of the ranked list based on the preset number, wherein the preset number is the maximum number of items capable of being displayed in the immediate view and further wherein the selected N items may be less than or equal in number to the preset number;

d) displaying the selected N items in the immediate view under the user defined heading corresponding to the chunky time based on when it is determined the item should be completed, wherein:

i) if the selected N items are equal to the present number, then displaying the selected N items in the immediate view, wherein the displayed selected items in the immediate view include at least one task, at least one list, and at least one calendar event, wherein in each item is displayed according to its corresponding chunky time; or ii) if the selected N items are less than the preset number, then displaying the selected N items in the immediate view, wherein the displayed selected items in the immediate view include at least one task, at least one list, and at least one calendar event, wherein in each item is displayed according to its corresponding chunky time and additionally displaying in the immediate view one or more items not having a due date;

e) receiving daily weather information for the present date; and f) displaying an alert for each item in the immediate view wherein the daily weather information indicates weather contrary to the specified type of weather preferred of said item;

f) repeating c and d on a predetermined basis in order to update the immediate view.

11. The computer readable media of claim 10, wherein said selecting step further comprises, for each item, adjusting the relevance when the each item has a predetermined priority level.

12. The computer readable media of claim 10, wherein the relevance comprises a percentage of time remaining for each item from the creation date to the due date based on the present date.

13. The computer readable media of claim 10, wherein the plurality of items of various types displayed in the immediate view comprise at least one task, at least one list, and at least one calendar event.

14. The computer readable media of claim 10, wherein the plurality of items of various types comprise items corresponding to a plurality of users.

15. The computer readable media of claim 10, wherein the selecting step comprises selecting all items having a due date equal to the present date.

* * * * *

UNITED STATES PATENT AND TRADEMARK OFFICE
CERTIFICATE OF CORRECTION

PATENT NO.       : 7,809,599 B2                                          Page 1 of 1
APPLICATION NO.  : 11/276190
DATED            : October 5, 2010
INVENTOR(S)      : Suzan Andrew et al.

It is certified that error appears in the above-identified patent and that said Letters Patent is hereby corrected as shown below:

In column 20, line 5, in Claim 1, delete "present" and insert -- preset --, therefor.

In column 21, line 32, in Claim 10, delete "present" and insert -- preset --, therefor.

Signed and Sealed this
Tenth Day of May, 2011

David J. Kappos
*Director of the United States Patent and Trademark Office*